United States Patent
Noda

(10) Patent No.: US 7,192,056 B2
(45) Date of Patent: Mar. 20, 2007

(54) WEBBING INSERTION MEMBER

(75) Inventor: Tomohide Noda, Kanzaki-gun (JP)

(73) Assignee: Takata Corporation, Tokyo (JP)

( * ) Notice: Subject to any disclaimer, the term of this patent is extended or adjusted under 35 U.S.C. 154(b) by 19 days.

(21) Appl. No.: 10/120,415

(22) Filed: Apr. 12, 2002

(65) Prior Publication Data
US 2002/0149192 A1    Oct. 17, 2002

(30) Foreign Application Priority Data
Apr. 12, 2001 (JP) ............................. 2001-114260

(51) Int. Cl.
*B60R 22/18* (2006.01)

(52) U.S. Cl. ...................................... 280/808
(58) Field of Classification Search ................ 280/808, 280/801.1; 297/468, 483
See application file for complete search history.

(56) References Cited

U.S. PATENT DOCUMENTS

| | | | | |
|---|---|---|---|---|
| 3,877,114 A | * | 4/1975 | Silen | ........................ 24/163 R |
| 3,981,052 A | * | 9/1976 | Pilarski | .................... 24/163 R |
| 4,005,904 A | * | 2/1977 | Weman et al. | ............. 297/483 |
| 4,023,826 A | * | 5/1977 | Kokubo et al. | ............ 297/483 |
| 4,349,217 A | * | 9/1982 | Fohl | .......................... 280/808 |
| 4,378,947 A | | 4/1983 | Foehl | |
| 4,402,528 A | | 9/1983 | Foehl | |
| 4,480,853 A | | 11/1984 | Ando et al. | |
| 4,607,864 A | * | 8/1986 | Kouketsu et al. | ........... 280/808 |
| 4,650,214 A | | 3/1987 | Higbee | |
| 4,890,951 A | | 1/1990 | Morinaga et al. | |
| 5,139,282 A | * | 8/1992 | Mein | .......................... 280/808 |
| 5,775,732 A | | 7/1998 | Grau | |
| 6,641,222 B2 | * | 11/2003 | Specht | ....................... 297/483 |
| 6,715,793 B2 | * | 4/2004 | Okubo | ....................... 280/808 |
| 2002/0158459 A9 | * | 10/2002 | Specht | ....................... 280/808 |
| 2003/0015865 A1 | * | 1/2003 | Tomita et al. | .............. 280/808 |
| 2003/0020271 A1 | * | 1/2003 | Okubo | ....................... 280/808 |

FOREIGN PATENT DOCUMENTS

| | | | |
|---|---|---|---|
| EP | 0 278 387 | | 8/1988 |
| EP | 0 307 339 | | 3/1989 |
| FR | 2626538 | * | 4/1989 |
| GB | 2026307 | * | 2/1980 |

\* cited by examiner

*Primary Examiner*—J. Allen Shriver
(74) *Attorney, Agent, or Firm*—Foley & Lardner LLP

(57) ABSTRACT

A webbing insertion member in which a webbing hardly shifts within an opening during the operation of a pretensioner mechanism. The insertion member includes a bearing portion and an opening through which the webbing passes. In order to prevent the shifting of the webbing in the longitudinal direction of the opening, a pair of webbing guides are formed to project from a surface of the bearing portion on a rear side of the insertion member. The webbing is suspended on the bearing portion and passes between the guides. Therefore, the guides confront with the left and right sides of the webbing thereby preventing the webbing from shifting in the lateral direction.

13 Claims, 8 Drawing Sheets

Fig. 1(a)
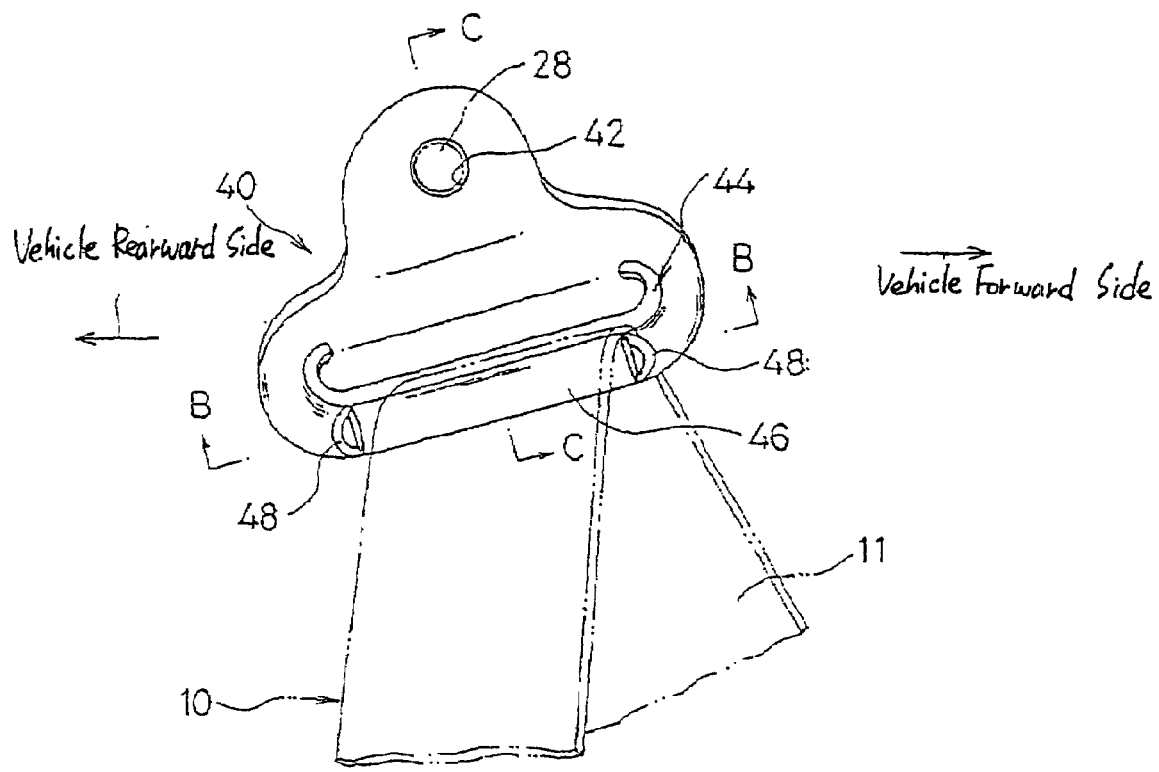
Fig. 1(b)
Fig. 1(c)
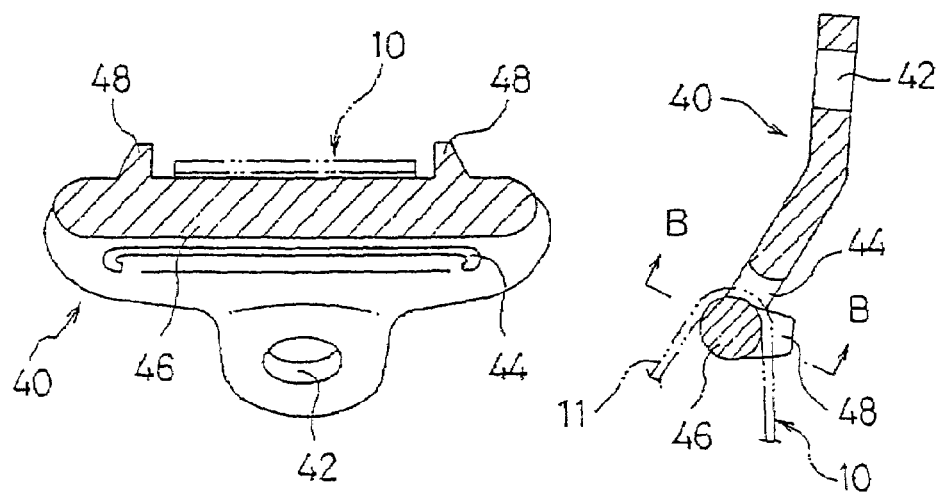

*Fig. 2(a)*
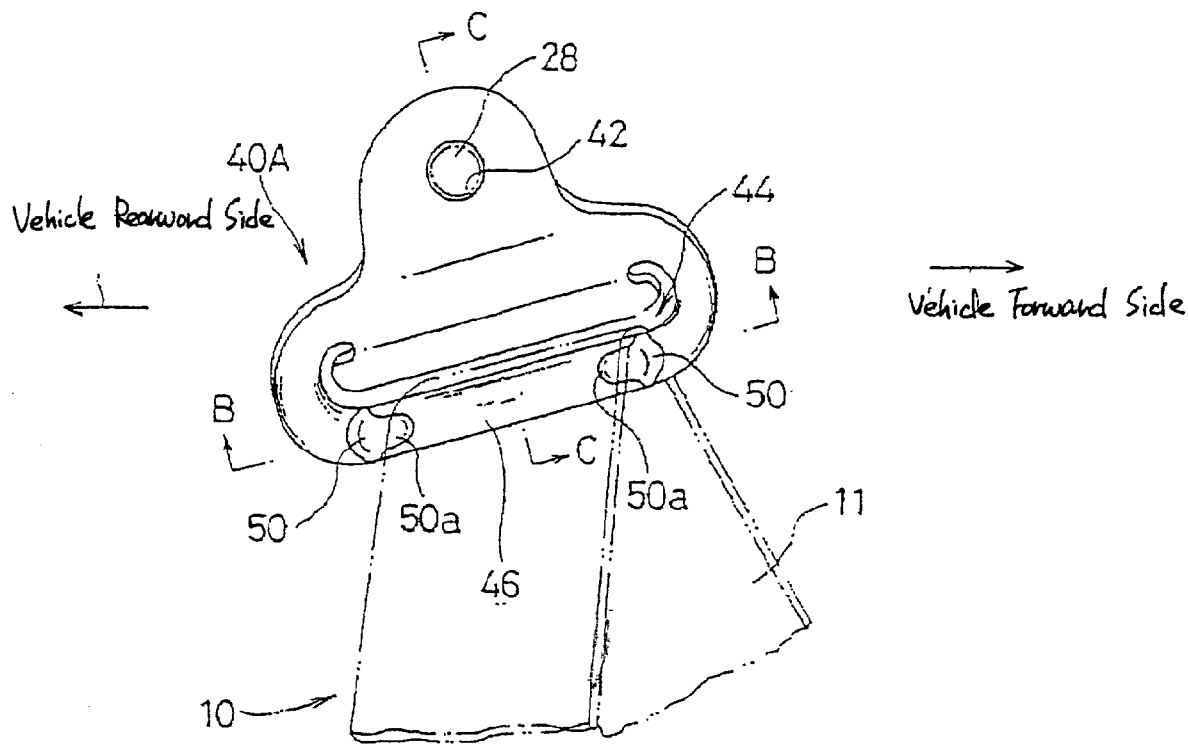
*Fig. 2(b)*
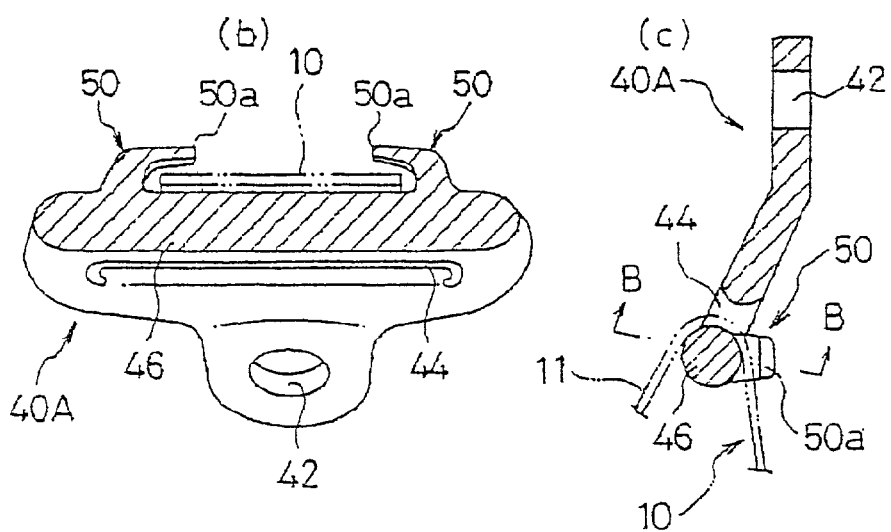
*Fig. 2(c)*

Fig. 4(a)
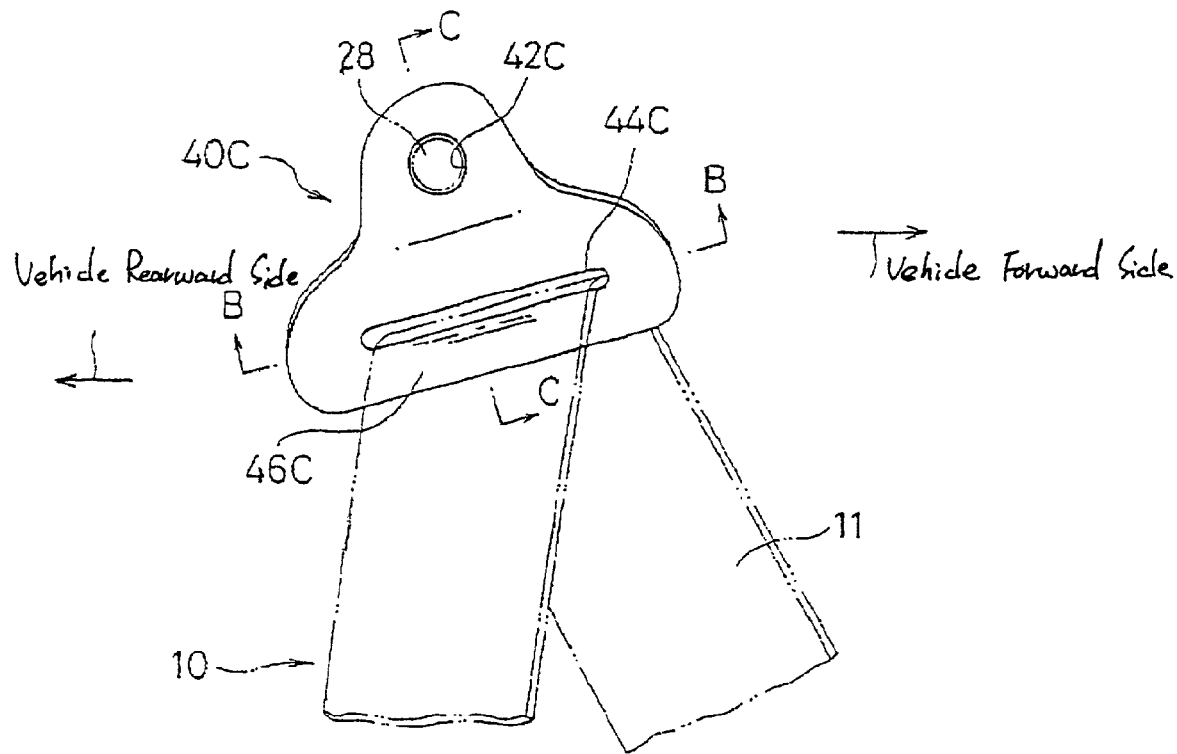
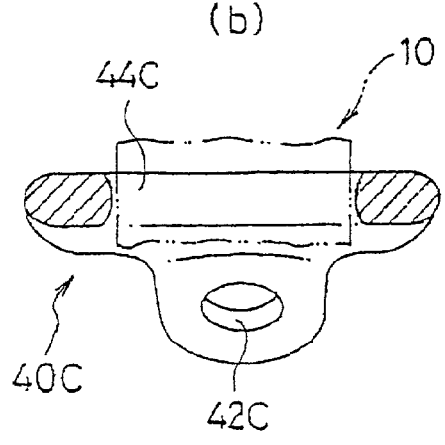
Fig. 4(b)
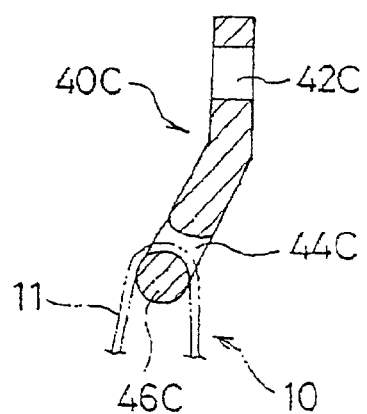
Fig. 4(c)

PRIOR ART

Fig. 8(a)
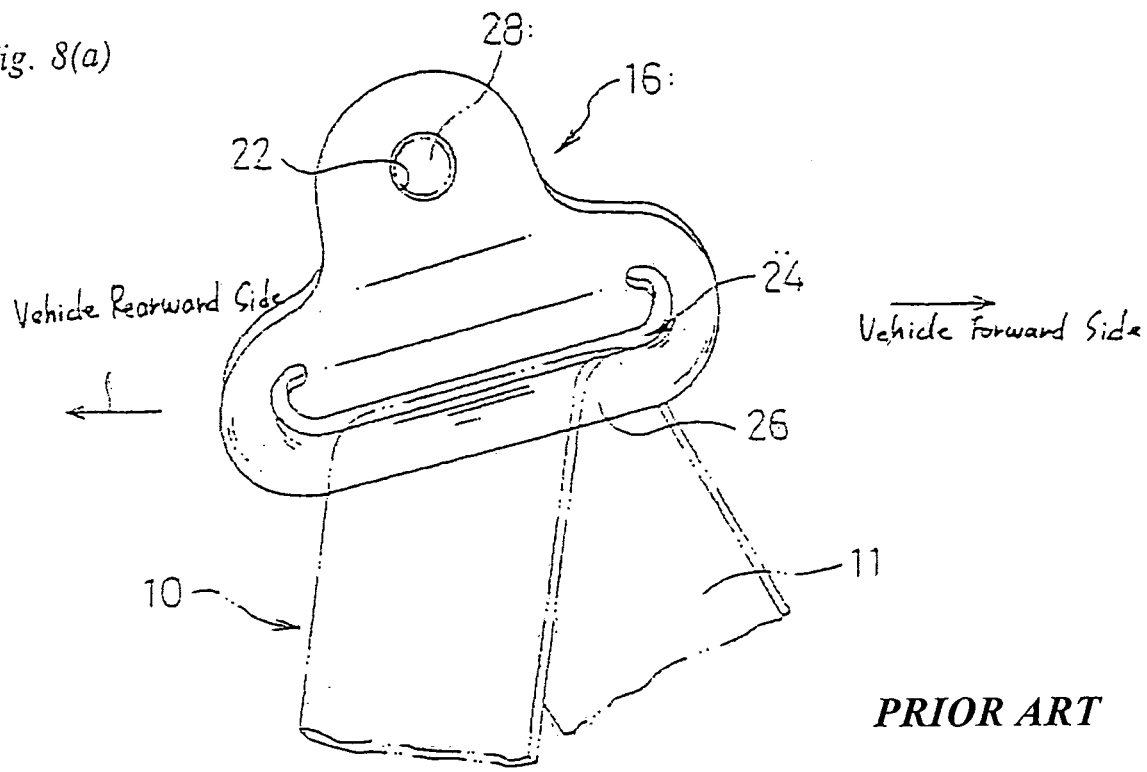
*PRIOR ART*
(b)
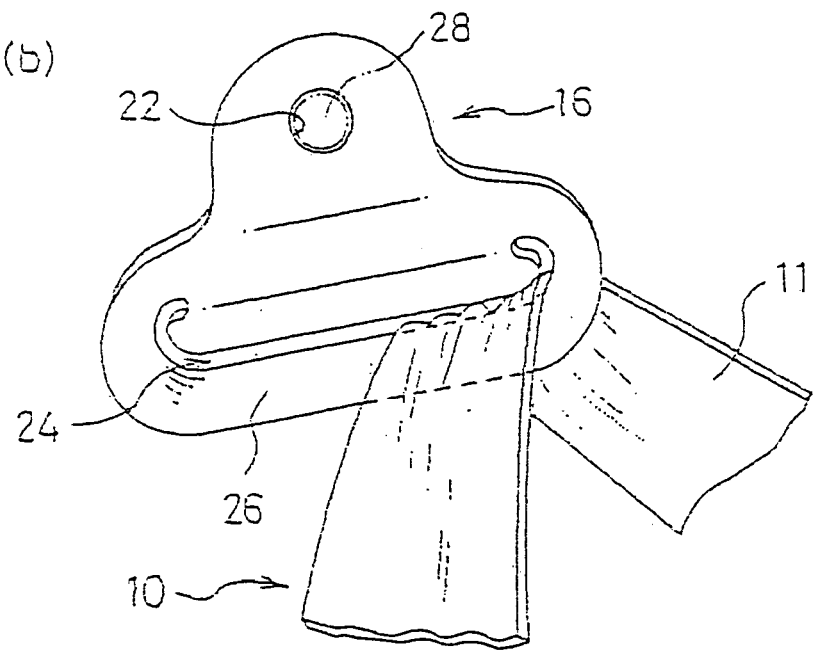
*PRIOR ART*
Fig. 8(b)

WEBBING INSERTION MEMBER

BACKGROUND

The present invention relates to a webbing insertion member, such as used with a shoulder webbing of a seat belt system.

As well known in the art, seat belt systems are installed in high-speed vehicles, such as automobiles and aircraft, for protecting occupants by means of webbing thereof. For example, as for a seat belt system for a front seat of an automobile, the webbing is suspended by a webbing insertion member disposed on a B-pillar of the automobile.

FIG. 7 is a general view showing an example of a seat belt system for an occupant in a vehicle front seat and FIG. 8(a) is a rear view (seen from a pillar side) showing a structural example of a conventional insertion member used for the seat belt system.

The seat belt system has a webbing 10 of which one end is connected to a retractor 12 in such a manner as to allow the winding and withdrawing of the webbing 10 and the other end is fixed to a vehicle body by an anchor 14. A portion of the webbing 10 therebetween is passed through an insertion member 16 and a tongue 18, respectively. The retractor 12 is provided with a return spring (not shown) which pulls the webbing 10 in the winding direction. Due to the spring, force in the winding direction is always applied to the webbing 10.

The insertion member 16 is provided with a bolt hole 22, formed in an upper portion thereof (FIG. 8(a)), for the installation to a B-pillar 20 and a webbing-through opening 24 formed in a lower portion thereof, the webbing-through opening 24 having a slit-like shape extending long in the width direction of the insertion member 16. Existing below the webbing-through opening 24 is a bearing portion 26 extending in the width direction of the pillar.

The webbing 10 withdrawn from the retractor 12 is passed through the webbing-through opening 24 and is suspended on the bearing portion 26 so that the webbing 10 is slidable along the outer surface of the bearing portion 26 in the winding and withdrawing direction.

The member 16 is positioned such that the width direction thereof extend along the longitudinal direction of the vehicle and is installed to the B-pillar 20 by the bolt 28 through the bolt hole 22 such that the member 16 can rock about the bolt 28 and pivot to the left or right (in the longitudinal direction of the vehicle). Though the insertion member 16 is fixed to the B-pillar 20 directly by the bolt 28 in this conventional example, the insertion member 16 is often installed to a height adjuster, vertically disposed on the B-pillar 20, with a bolt or the like.

In the seat belt system for an automobile having the aforementioned structure, when it is desired to wear the seat belt an occupant pulls the webbing 10 from the retractor 12 and puts the webbing 10 across the front of the occupant's body. The portion of the webbing 10 between the insertion member 16 and the tongue 18 is called as a shoulder belt portion 11. Then, a tongue plate 19 of the tongue 18 on the webbing 10 is latched with a buckle 30, thereby securing the webbing 10 around the occupant. For releasing the wearing of the webbing 10, the tongue 18 is released from the buckle 30 by pressing a release button 31 of the buckle 30. Then, the webbing 10 is wound by the winding force of the retractor 12. The webbing 10 slides along the outer surface of the bearing portion 26 in both cases of withdrawing the webbing 10 and of winding the webbing 10 into the retractor 12.

The retractor 12 may have a pretensioner mechanism and an EA (energy absorbing) mechanism incorporated therein. The pretensioner mechanism is provided for winding up a predetermined length of the webbing 10 in an emergency situation such as a vehicle collision, in order to securely restrain the occupant to a vehicle seat. The EA mechanism is provided for allowing the webbing to be gradually withdrawn from the retractor when a predetermined load is applied to the webbing 10 by the occupant after the webbing 10 is wound by the operation of the pretensioner mechanism, in order to absorb the impact exerted on the occupant.

The shoulder belt portion 11 is positioned on the vehicle front side (the right in FIG. 8(a)) from the insertion member 16 when the seat belt is worn as shown by two-dotted lines in FIG. 8(a).

In this state, as the pretensioner mechanism or the EA mechanism is actuated so that the webbing 10 is rapidly and strongly wound into the retractor 12 or suddenly withdrawn from the retractor 12, the webbing 10 may shift to the vehicle front side or the vehicle rear side along the bearing portion 26 so that the webbing 10 is inclined within the webbing-through opening 24 as shown in FIG. 8(b). It should be noted that this situation also depends on the size and the attitude of the occupant, the position and the reclining angle of the vehicle seat, and the layout of the vehicle cabin.

The webbing 10 may be inclined within the opening 24 not only with the winding or withdrawing of the webbing due to the actuation of the pretensioner mechanism or the EA mechanism, but also with the normal winding or withdrawing of the webbing 10 due to the position of the B-pillar 20, the installation angle of the insertion member 16, the position of the vehicle seat, the layout of the vehicle cabin, and/or the attitude or the size of the occupant, for example, even when the retractor 12 does not include the pretensioner mechanism or the EA mechanism.

When the webbing 10 is significantly inclined, the webbing 10 is gathered and locally stressed by large tension as shown in FIG. 8(b). To withstand this, the webbing 10 is required to have large tensile strength, thus increasing the cost.

SUMMARY OF THE INVENTION

One object of the present invention to provide a webbing insertion member in which during operation of a pretensioner mechanism or the like the webbing is hardly inclined within an opening in the guide.

According to the present invention, a webbing insertion member is provided. The insertion member includes an opening through which the webbing passes; and a webbing guide for guiding at least one of the sides of the webbing in order to prevent the webbing from shifting along the longitudinal direction of the opening in the insertion member. The webbing guide is disposed in or near the opening in the insertion member.

According to the present invention, since the webbing is guided by the webbing guide even when the webbing is rapidly retracted into the retractor by the actuation of the pretensioner mechanism or withdrawn because of the function of the EA mechanism, the webbing is prevented from inclining to one side within the webbing-through opening. The webbing guide may be disposed to guide only one side of the webbing or may be disposed to guide the both sides of the webbing.

The webbing guide may be disposed near or in the opening in the insertion member. When the guide is positioned in the opening, the opening may have a size in the longitudinal direction which is greater than the size of the webbing.

According to the present invention, the opening may include concave surfaces spaced apart at a distance slightly greater than the width of the webbing, for example, 1.01 to 1.1 times as large as the width of the webbing. The concavities are positioned the webbing-through opening or in a surface of the webbing-through opening, and said webbing guide may be composed of steps on both sides of the concavity.

In the webbing insertion member of the present invention having the aforementioned structure, the webbing is guided by the steps as the both sides of the concavity, thereby preventing the webbing from inclining to one side within the webbing-through opening.

Also according to the present invention, the webbing-through opening has a length in the longitudinal direction which is slightly greater than the width of the webbing, for example, 1.01 to 1.1 times as large as the width of the webbing, and said webbing guide is composed of the both corners of the webbing-through opening in the longitudinal direction. In this case, it can eliminate the necessity of forming a convexity (convexities) or a concavity (concavities) as the webbing guide.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 1(a) is a rear view (seen from a B-pillar side) of an insertion member, of a seat belt system for a vehicle front seat, as a webbing insertion member according to an embodiment of the present invention.

FIG. 1(b) is a sectional view taken along a line B—B of FIGS. 1(a) and 1(c).

FIG. 1(c) is a sectional view taken along a line C—C of FIG. 1(a).

FIG. 2(a) is a rear view of an insertion member, of a seat belt system for a vehicle front seat, as a webbing insertion member according to another embodiment of the present invention.

FIG. 2(b) is a sectional view taken along a line B—B of FIGS. 2(a) and 2(c).

FIG. 2(c) is a sectional view taken along a line C—C of FIG. 2(a).

FIG. 4(a) is a rear view of an insertion member, of a seat belt system for a vehicle front seat, as a webbing insertion member according to another embodiment of the present invention.

FIG. 4(b) is a sectional view taken along a line B—B of FIG. 4(a) and FIG. 4(c).

FIG. 4(c) is a sectional view taken along a line C—C of FIG. 4(a).

FIGS. 8(a), 8(b) are illustrations showing a structural example of a conventional insertion member used for the seat belt system shown in FIG. 7.

DETAILED DESCRIPTION

Figure 3A:
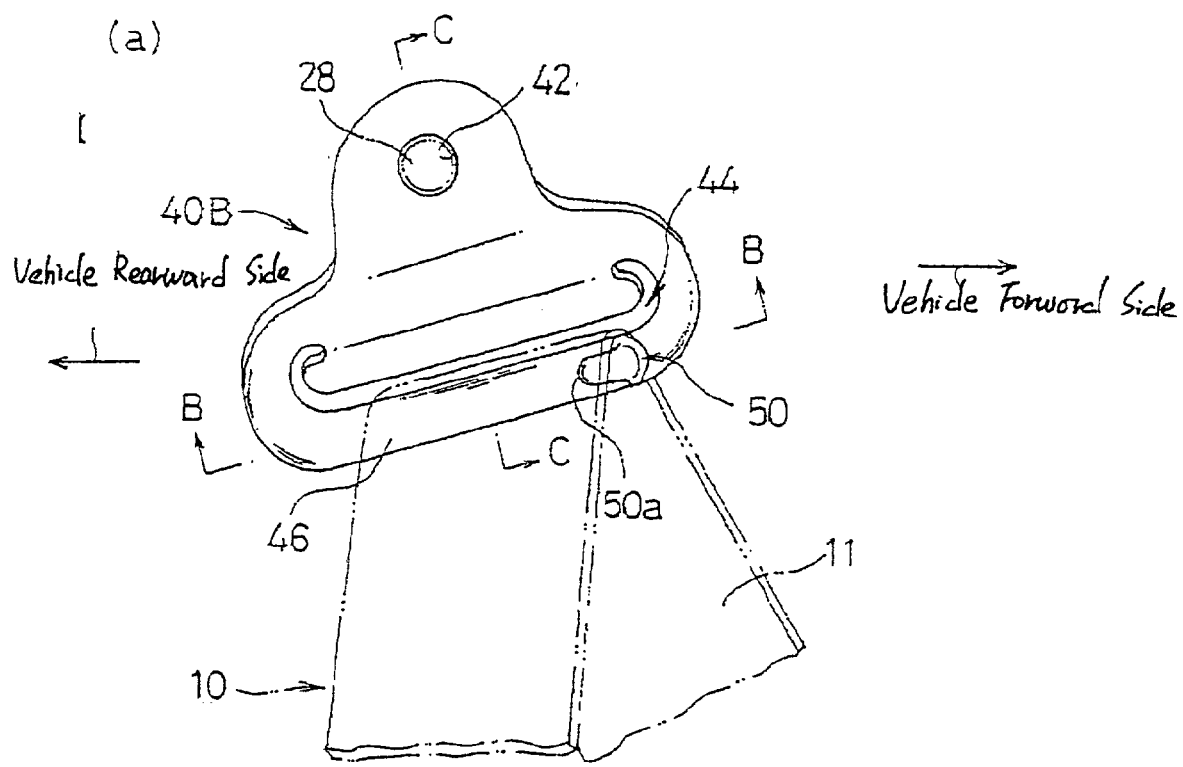
FIG. 3(a) is a rear view of an insertion member, of a seat belt system for a vehicle front seat, as a webbing insertion member according to still another embodiment of the present invention.
Figure 3B:
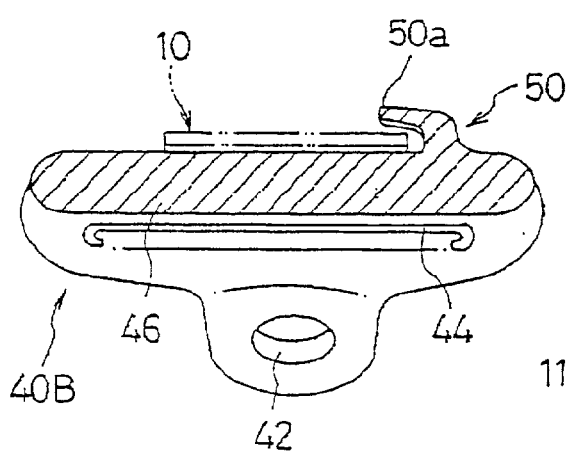
FIG. 3(b) is a sectional view taken along a line B—B of FIG. 3(a) and FIG. 3(c).
Figure 3C:
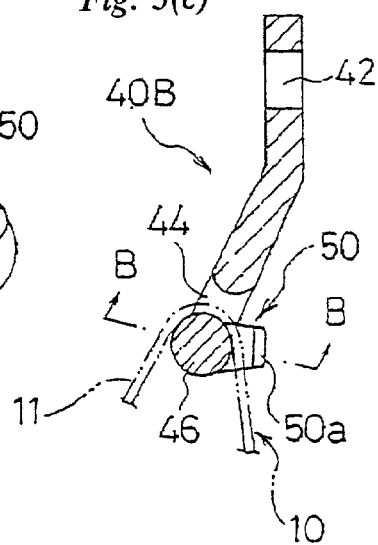
FIG. 3(c) is a sectional view taken along a line C—C of FIG. 3(a).

Hereinafter, embodiments of the present invention will be described with reference to the attached drawings. FIGS. 1(a)–1(c) disclose an embodiment of the present invention. It should be noted that the insertion member of this embodiment is used in a seat belt system for an occupant in a vehicle front seat, similarly to the seat belt system shown in FIG. 7. In the following description, the same reference numerals used in FIG. 7 designate similar elements of FIGS. 1–6.

Similarly to the above described system, the seat belt system according to the present invention includes a webbing 10 having one end connected to a retractor 12 in such a manner as to allow the winding and withdrawing of the webbing 10. The other end of the webbing may be fixed to a vehicle body by an anchor 14. A portion of the webbing 10 therebetween passes through an insertion member 40 and a tongue 18, respectively. In FIGS. 1(a)–1(c), the illustrations of the retractor 12, the tongue 18, a bolt 28, and a B-pillar 20, which will be described later, are omitted.

The retractor 12 may be provided with a return spring which pulls the webbing 10 in the winding direction. As a result, force in the winding direction is always applied to the webbing 10. In addition, the retractor 12 may include a pretensioner mechanism for winding up a predetermined length of the webbing 10 in an emergency situation such as a vehicle collision, in order to securely restrain the occupant to the vehicle seat. The retractor 12 may also include an EA mechanism for allowing the webbing 10 to be gradually withdrawn from the retractor 12 when a predetermined load is applied to the webbing 10 by the occupant after the webbing 10 is wound by the operation of the pretensioner mechanism, in order to absorb a portion of the impact exerted on the occupant.

According to the embodiment of the present invention the insertion member 40 is provided with a bolt hole 42, formed in an upper portion thereof, for the installation to the B-pillar 20. The insertion member also includes a webbing-through opening 44 formed in a lower portion thereof. The webbing-through opening 44 has a slit-like shape extending in the width direction of the insertion member 40. A bearing portion 46 is located below the webbing-through opening 44. The webbing 10 is suspended on the bearing portion 46 as it is withdrawn from the retractor 12. The bearing portion 46 extends in the width direction of the insertion member 40.

In order to prevent the shifting of the webbing 10 in the longitudinal direction of the webbing-through opening 44, a pair of convexities or steps 48, 48 are provided. The convexities 48 function as webbing guides and are formed to project from a surface of the bearing portion 46 on a rear side of the insertion member 40 (the side confronting facing B-pillar 20 when installed to the B-pillar 20). The convexities 48, 48 are spaced apart from each other in the longitudinal direction of the bearing portion 46 at a distance slightly greater than the width of the webbing 10 (for example, a distance of 1.01 to 1.1 times as large as the width of the webbing 10). The height of each convexity 48 is greater than the thickness of the webbing 10. As the webbing 10 is suspended on the bearing portion 46, the convexities 48, 48 guide the left and right sides of the webbing 10.

The insertion member 40 is positioned such that the width direction thereof extend along the longitudinal direction of the vehicle and is installed to the B-pillar 20 by the bolt 28 through the bolt hole 42 such that the insertion member 40 can rock about the bolt 28 and pivot to the left and right (in the longitudinal direction of the vehicle).

The webbing 10 withdrawn from the retractor 12 is passed through the webbing-through opening 44 from the rear side of the insertion member 40 and is suspended on the bearing portion 46 so that the webbing 10 is slidable along the outer surface of the bearing portion 46 in the winding and withdrawing direction. As the webbing slides across the bearing portion 46, on the rear side of the insertion member 40, the webbing 10 is passed between the aforementioned convexities 48, 48. Therefore, the convexities 48, 48 confront the left and right sides of the webbing 10, respectively. As a result, the the shifting of the webbing 10 in the lateral direction (the longitudinal direction of the bearing portion 46) is restricted. While the webbing 10 is wound and withdrawn, the webbing 10 slides along the outer surface of the bearing portion 46 between the convexities 48, 48.

In the seat belt system provided with the insertion member 40 having the aforementioned structure, even when the pretensioner mechanism is actuated in the event of emergency such as a vehicle collision so that the webbing 10 is rapidly and strongly retracted into the retractor 12, the lateral shifting of the webbing 10 is restricted because the convexities 48 confront with the sides of the webbing 10, thereby preventing the webbing 10 from inclining to one side within the webbing-through opening 44.

Though a pair of convexities 48 are provided as guides projecting convexly from the outer surface of the bearing portion 46 on the rear side of the insertion member 40. The convexities 48 include steps abuting the webbing 10. However, the configuration of the guides is not limited thereto. Alternatively, the guides may be composed of steps formed on the both sides in the longitudinal direction of the bearing portion 46 by recessing the bearing portion 46. Further, the guides may be formed not only on the rear surface but also on the front surface of the insertion member 40 and on the surface of the webbing-through opening 40 and plural pairs of guides may be provided. The guide may be formed in a flange shape extending around the entire or a portion of the periphery of the bearing portion 46. The guide may be provided only on one side in the longitudinal direction of the bearing portion 46 (the side toward which the webbing 10 should shift when retracted by the retractor 12 or withdrawn from the retractor 12 because of the actuation of the pretensioner mechanism or the EA mechanism). FIGS. 2(*a*)–2(*c*) and FIGS. 3(*a*)–3(*c*) show further examples of alternatives of the present invention.

In another embodiment of the present invention, shown in FIGS. 2(*a*)–2(*c*), an insertion member 40A includes a pair of claw convexities 50 formed on an outer surface of the bearing portion 46 to extend along the rear surface of the insertion member 40A. The convexities 50 are disposed to guide the left and right sides of the webbing 10 suspended on the bearing portion 46. Each convexity 50 includes an inner concave surface concavity 50 formed under a claw 50*a* which overhangs a side edge of the webbing 10.

In a seat belt system provided with the insertion member 40A, even when the webbing 10 is retracted into the retractor 12 because of the actuation of the pretensioner mechanism, the webbing 10 is prevented from shifting within the webbing-through opening 44. During the normal winding and withdrawing motion of the webbing 10, the claws 50*a* hold the webbing 10, thereby preventing the webbing 10 from fluttering against the outer surface of the bearing portion 46.

In yet another alternative embodiment of the present invention, shown in FIGS. 3(*a*)–3(*c*), an insertion member 40B is structured to have such a concavity only on the vehicle forward side (the right side in FIG. 3(*a*)) in the longitudinal direction of the bearing portion 46. Also according to this structure, the webbing 10 is prevented from inclining within the webbing-through opening 44.

For the embodiments shown in FIGS. 2(*a*)–3(*c*), the components of the insertion members 40A, 40B are the same as those of the aforementioned insertion member 40 so that the same elements are designated by the same reference numerals as used in FIGS. 1(*a*)–1(*c*).

Figure 7:
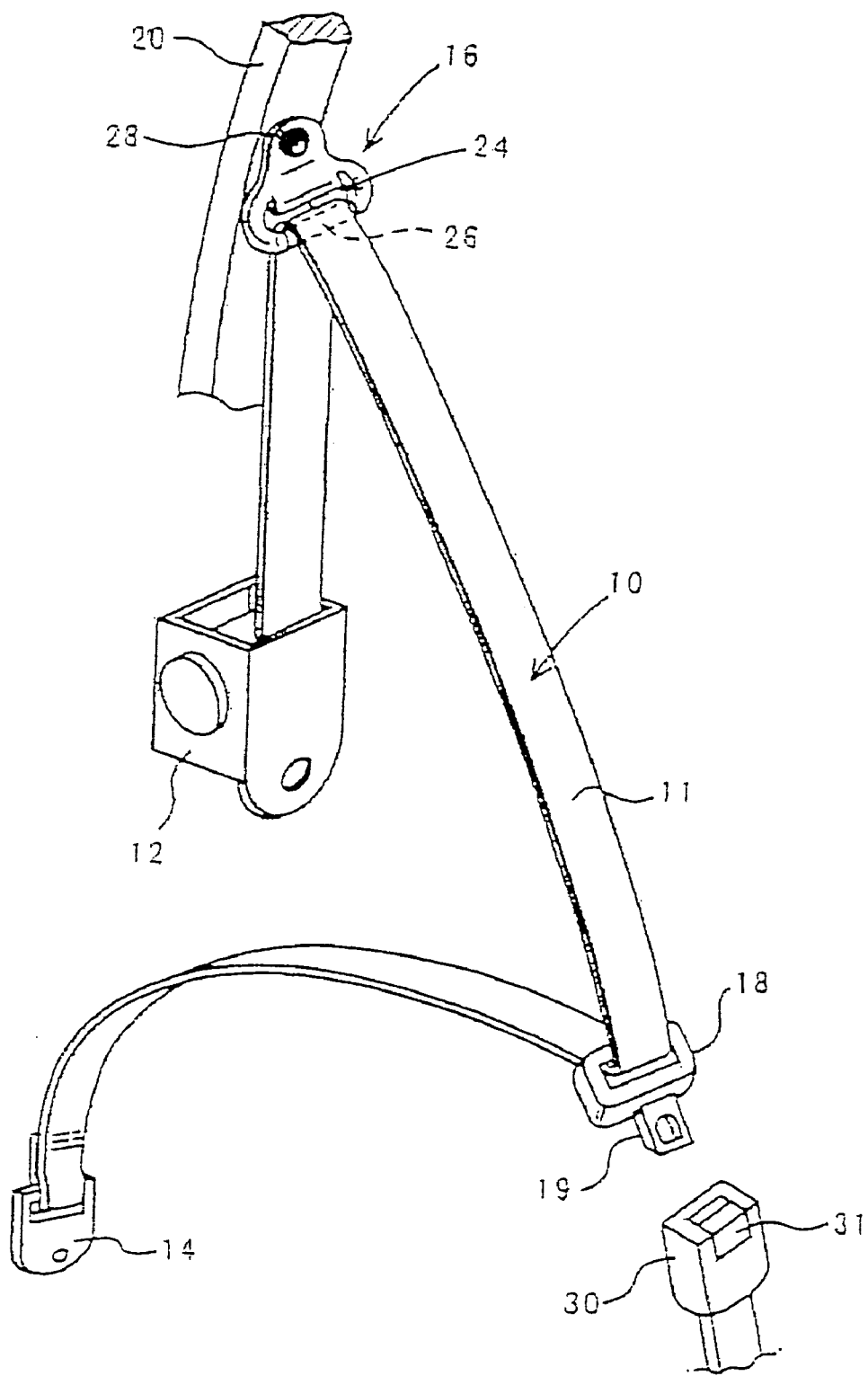
FIG. 7 is an entire view showing a structural example of a seat belt system for a vehicle front seat.

Another embodiment of the present invention is shown in FIGS. 4(*a*)–4(*c*). It should be noted that the insertion member 40C of this embodiment is used in a seat belt system for an occupant in a vehicle front seat, similar to insertion members 40, 40A, 40B. In the following description, the same elements as those in FIG. 7 are designated by the same reference numerals as used in FIG. 7 and the description about these elements will be omitted.

As shown in FIG. 4(*a*), the insertion member 40C is provided with a bolt hole 42C, formed in an upper portion thereof, for the installation to the B-pillar 20 and a webbing-through opening 44C formed in a lower portion thereof, the webbing-through opening 44C having a slit-like shape extending long in the width direction of the insertion member 40C. Existing below the webbing-through opening 44C is a bearing portion 46C on which the webbing withdrawn from the retractor 12 is suspended. The bearing portion 46C extends in the width direction of the insertion member 40C.

The length of the webbing-through opening 44C in the longitudinal direction is substantially equal to or slightly greater than the width of the webbing 10, for example, 1.01 to 1.1 times as large as the width of the webbing 10. Therefore, as the webbing 10 is passed through the webbing-through opening 44C, the corners of the webbing-through opening 44C on the both sides in the longitudinal direction confront with the left and right sides of the webbing 10. As a result, the webbing 10 hardly shifts in the lateral direction within the opening 44.

In the seat belt system with the insertion member 40C having the aforementioned structure, even when the webbing is retracted by the retractor 12 because of the actuation of the pretensioner mechanism, the webbing 10 hardly shifts in the lateral direction within the webbing-through opening 44C, thereby securely preventing the inclination of the webbing 10.

Though the webbing insertion member is installed to the B-pillar in the aforementioned embodiments, it may be installed to a C or D-pillar.

Figure 5:
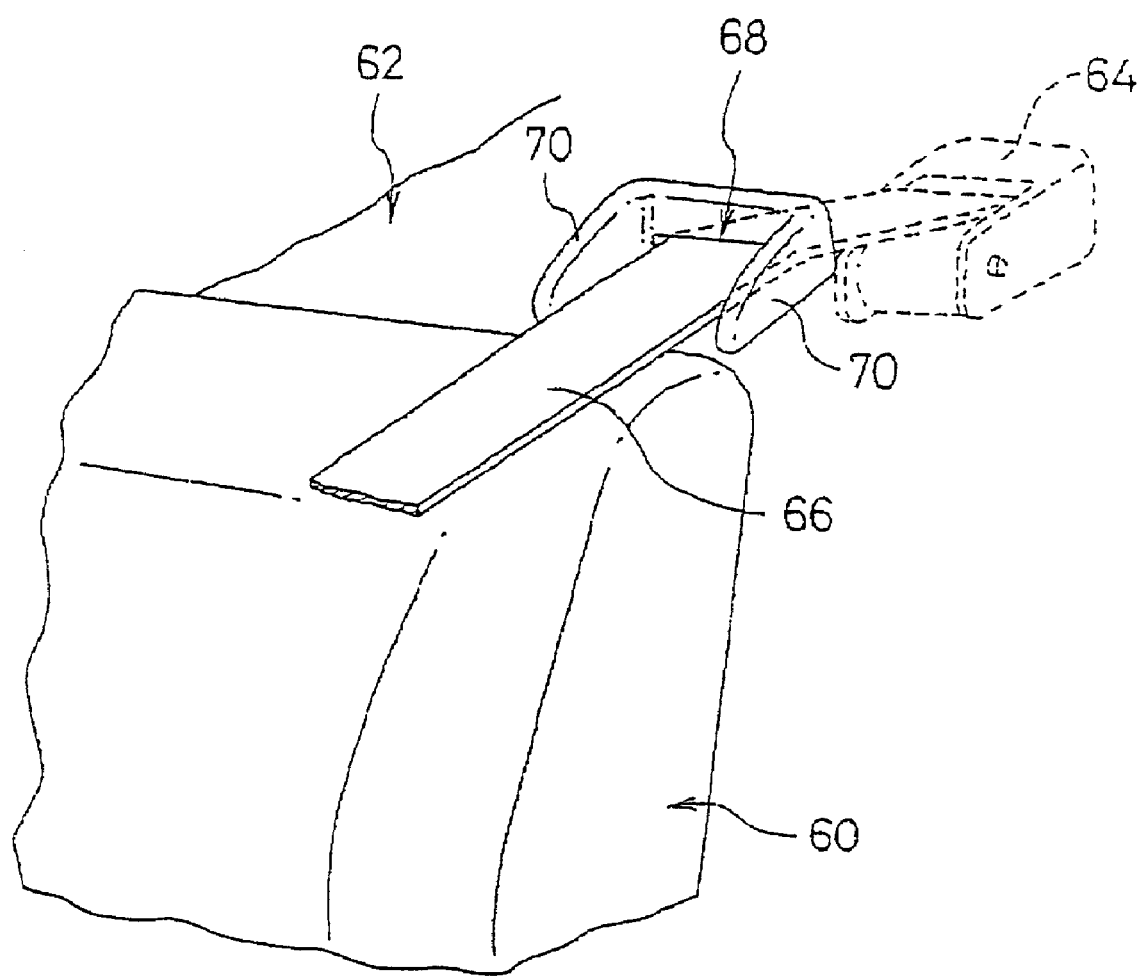
FIG. 5 is a perspective view showing main parts of a seat belt system for a vehicle rear seat which is provided with a webbing insertion member as a webbing-through opening according to an embodiment of the present invention.

Furthermore, the present invention may be applied to various webbing insertion members other than a webbing insertion member of a type of being installed to a pillar. For example, FIG. 5 discloses an embodiment of the invention where the insertion member is used in a seat belt system for a rear seat passenger in an automobile. As shown in FIG. 5, the scope of the present invention includes webbing insertion members wherein the webbing does not deflect or change direction as it passes through the opening in the member.

In the seat belt system for a rear seat passenger, a retractor 64 is disposed below a rear shelf 62 and behind the vehicle rear seat 60. The webbing 66 is withdrawn forwardly from the retractor 64 through the webbing-through opening 68 formed in the rear shelf 62. A pair of wall-like convexities 70 are formed on the both sides of the webbing-through opening 68 to extend in the withdrawing direction of the webbing 66 so as to confront with the left and right sides of the webbing 66, respectively.

Similarly to the aforementioned retractor 12 shown in FIG. 7, the retractor 64 may be provided with a return spring which pulls the webbing 66 in the winding direction. As a result, force in the winding direction is always applied to the webbing 66. The retractor 64 also has a pretensioner mechanism for winding up a predetermined length of the webbing 66 in the event of an emergency such as a vehicle collision, in order to securely restrain the occupant to a vehicle seat, and an EA mechanism for allowing the webbing to be gradually withdrawn from the retractor when a predetermined load is applied to the webbing 66 by the occupant after the webbing 66 is wound by the operation of the pretensioner mechanism, in order to absorb the impact exerted on the occupant.

In the seat belt system for a rear seat passenger having the aforementioned structure, the wall-like convexities 70 extending in the extending direction of the webbing 66 are provided along the left and right side edges of the webbing 66. As a result, the webbing 66 hardly shifts within the opening 68 even when the webbing 66 is retracted by the retractor 64 because of the actuation of the pretensioner mechanism in the event of emergency such as a vehicle collision.

Figure 6:
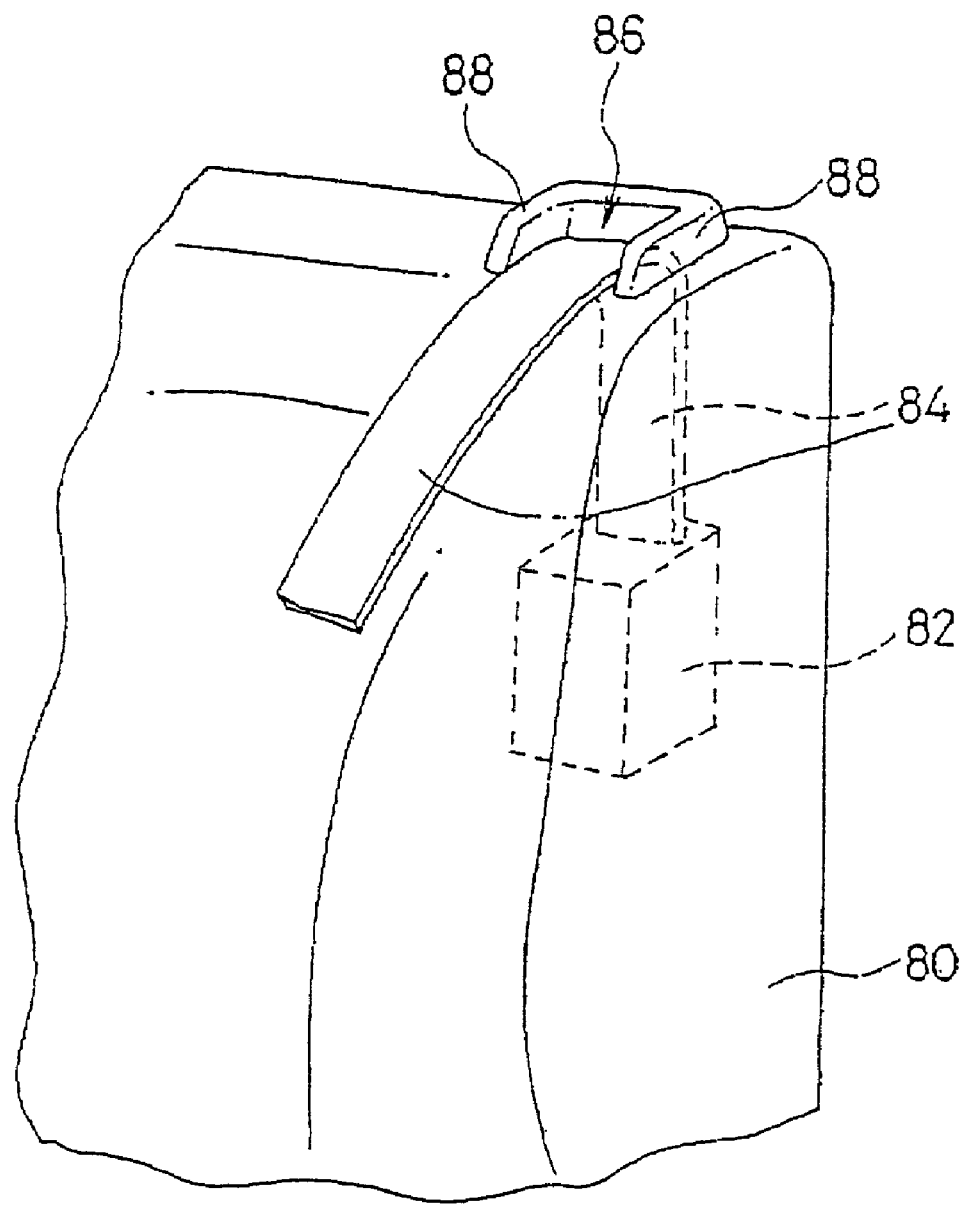
FIG. 6 is a perspective view showing main parts of a seat belt system which is provided with a webbing insertion member according to an embodiment of the present invention.

FIG. 6 discloses another embodiment of the present invention. As shown in FIG. 6, an insertion member is provided in a seat belt system of which a retractor is mounted in a seat back. As shown in FIG. 6, a retractor 82 is mounted in a seat back 80 of a vehicle seat. The webbing 84 is withdrawn forwardly from the retractor 82 through a webbing-through opening 86 formed in a side top of the seat back 80. A pair of wall-like convexities 88 are formed on the both sides of the webbing-through opening 86 to extend in the withdrawing direction of the webbing 84 so as to confront with the left and right sides of the webbing 84, respectively.

The retractor 82 may be provided with a return spring which always apply force in the winding direction to the webbing 84, a pretensioner mechanism for securely restraining the occupant to the vehicle seat in the event of an emergency such as a vehicle collision, and an EA mechanism for absorbing the impact exerted on the occupant after the operation of the pretensioner mechanism.

In the seat belt system having the aforementioned structure, the wall-like convexities 88 extending in the extending direction of the webbing 84 are provided along the left and right side edges of the webbing 84. As a result, the webbing 84 hardly shifts within the webbing-through opening 86 even when the webbing 84 is retracted by the retractor 64 because of the actuation of the pretensioner mechanism in the event of emergency such as a vehicle collision.

Though the wall-like concavities bordering the left and right sides of the webbing are disposed on the left and right sides of the webbing-through opening in the seat belt system shown in FIGS. 5, 6, the convexities may take another form. For example, the convexities may take the form of projections just like the convexities 48 shown in FIGS. 1(a)–1(c), or the form of hooks having claws for holding the side edges of the webbing, just like the convexities 50 shown in FIGS. 2(a)–2(c). The convexity may be disposed only on a side to which the webbing easily shifts during the operation of the pretensioner mechanism just like a case shown in FIGS. 3(a)–3(c).

As described above, according to the webbing insertion member of the present invention, the webbing hardly shifts within the webbing-through opening during the operation of the pretensioner mechanism, thereby preventing the webbing from being gathered. Therefore, the required tensile strength of the webbing can be reduced.

The priority document, Japanese Patent Application No. 2001-114260 filed Apr. 12, 2001, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt system for a vehicle, comprising:
    a webbing insertion member including an opening through which a webbing may pass; and
    a webbing guide for guiding at least one of the sides of the webbing in order to prevent the webbing from shifting along the longitudinal direction of the opening,
    wherein the webbing guide is disposed in or near the opening and is integrally formed with the webbing insertion member; and wherein the insertion member is connected directly to a vehicle pillar, and
    wherein the webbing guide comprises first and second protrusions extending from a bearing portion of the webbing insertion member and disposed adjacent to the opening.

2. The system of claim 1, wherein the distance between the protrusions is slightly greater than the width of the webbing.

3. The system of claim 1, wherein the protrusions comprise a pair of steps located on both sides of the opening.

4. The system of claim 1, wherein at least one end of the webbing guide is bent inwardly.

5. The system of claim 4, wherein the at least one end of the webbing guide is bent such that a portion of the guide is substantially parallel with a front surface of the webbing insertion member.

6. The system of claim 1, wherein the height of each protrusion is greater than the thickness of the webbing.

7. The system of claim 1, wherein the first and second protrusions confront left and right sides of the webbing, respectively.

8. A seat belt system for a vehicle comprising:
    a webbing insertion member including an opening through which a webbing may pass, and wherein the opening has a length in the longitudinal direction which is slightly greater than the width of the webbing; and
    a webbing guide for guiding at least one of the sides of the webbing in order to prevent the webbing from shifting along the longitudinal direction of the opening, wherein the webbing guide is integrally formed with the webbing insertion member and includes the longitudinal ends of the opening, and wherein the insertion member is connected directly to a vehicle pillar.

9. The system of claim 8, wherein the length of the opening in the longitudinal direction is 1.01 to 1.1 times as large as the width of the webbing.

10. A seat belt system for a vehicle, comprising:
a webbing insertion member including an opening through which a webbing may pass; and
a webbing guide for guiding at least one of the sides of the webbing in order to prevent the webbing from shifting along the longitudinal direction of the opening,
wherein the webbing guide is disposed in or near the opening and is integrally formed with the webbing insertion member and wherein the insertion member is connected directly to a vehicle pillar, and
wherein the webbing guide comprises a L-shaped projection extending from a bearing portion of the webbing insertion member and disposed adjacent to the opening.

11. The system of claim 10, wherein a portion of the L-shaped projection overhangs a side edge of the webbing.

12. The system of claim 10, wherein the webbing guide further includes a second L-shaped projection.

13. The system of claim 10, wherein the L-shaped projection is disposed on a vehicle forward side in the longitudinal direction of the bearing portion.

* * * * *